(12) United States Patent
Bosua (10) Patent No.: US 12,092,589 B1
(45) Date of Patent: Sep. 17, 2024

(54) IN VITRO ANALYTE SENSOR USING ONE OR MORE DETECTOR ARRAYS THAT OPERATE IN RADIO/MICROWAVE FREQUENCY BANDS

(71) Applicant: Know Labs, Inc., Seattle, WA (US)

(72) Inventor: Phillip Bosua, Seattle, WA (US)

(73) Assignee: Know Labs, Inc., Seattle, WA (US)

( * ) Notice: Subject to any disclaimer, the term of this patent is extended or adjusted under 35 U.S.C. 154(b) by 855 days.

(21) Appl. No.: 17/198,760

(22) Filed: Mar. 11, 2021

Related U.S. Application Data (60) Provisional application No. 63/004,699, filed on Apr. 3, 2020.

(51) Int. Cl.
*G01N 22/00* (2006.01)
*H01Q 21/06* (2006.01)
*H01Q 1/52* (2006.01)

(52) U.S. Cl.
CPC ............ *G01N 22/00* (2013.01); *H01Q 21/06* (2013.01); *H01Q 1/523* (2013.01)

(58) Field of Classification Search
CPC ......... G01N 22/00; H01Q 21/06; H01Q 1/523
See application file for complete search history.

(56) References Cited

U.S. PATENT DOCUMENTS

| | | | |
|---|---|---|---|
| 6,448,788 B1 * | 9/2002 | Meaney | H01Q 21/20 703/2 |
| 7,135,870 B2 * | 11/2006 | Mohajer | G01R 27/22 324/698 |
| 8,223,021 B2 | 7/2012 | Goodnow et al. | |
| 9,041,920 B2 | 5/2015 | Mander et al. | |
| 9,198,607 B2 | 12/2015 | Fischer | |

(Continued)

FOREIGN PATENT DOCUMENTS

| | | |
|---|---|---|
| EP | 3146898 B1 | 11/2018 |
| EP | 3981329 A1 | 4/2022 |

(Continued)

OTHER PUBLICATIONS

Hanna, J. et al., "Noninvasive, wearable, and tunable electromagnetic multisensing system for continuous glucose monitoring, mimicking vasculature anatomy," Science Advances, 6, eaba5320, 2020 (11 pages).

(Continued)

*Primary Examiner* — Neel D Shah
*Assistant Examiner* — Adam S Clarke
(74) *Attorney, Agent, or Firm* — MERCHANT & GOULD (57) ABSTRACT

An analyte sensor for use in detecting an analyte in an in vitro sample via spectroscopic techniques using non-optical frequencies that are in the radio or microwave frequency bands of the electromagnetic spectrum. The analyte sensor uses at least one transmit antenna (which may also be referred to as a transmit element) that functions to transmit a signal in the radio or microwave frequency range of the electromagnetic spectrum into the in vitro sample containing an analyte of interest, and at least one receive antenna (which may also be referred to as a receive element) that functions to detect a response resulting from transmission of the transmit signal by the transmit antenna into the sample. The data can then be analyzed to detect the presence of the analyte and/or determine a concentration of the analyte.

16 Claims, 7 Drawing Sheets

(56) References Cited

U.S. PATENT DOCUMENTS

| | | | |
|---|---|---|---|
| 9,864,024 | B2 | 1/2018 | Vester |
| 9,869,636 | B2 | 1/2018 | Mander et al. |
| 10,149,629 | B2 | 12/2018 | Szczepaniak et al. |
| 10,478,101 | B1 | 11/2019 | Cespedes et al. |
| 10,548,503 | B2 | 2/2020 | Bosua |
| 10,617,296 | B2 | 4/2020 | Sloan et al. |
| 10,856,766 | B2 | 12/2020 | Leabman |
| 10,912,500 | B2 | 2/2021 | Poeze et al. |
| 10,956,950 | B2 | 3/2021 | Al-Ali et al. |
| 11,031,970 | B1 | 6/2021 | Bosua |
| 11,202,582 | B2 | 12/2021 | Verkruijsse et al. |
| 11,244,753 | B2 | 2/2022 | Haggerty et al. |
| 11,291,374 | B2 | 4/2022 | Lee et al. |
| 11,298,037 | B2 | 4/2022 | Leabman |
| 11,350,830 | B2 | 6/2022 | Mckenna et al. |
| 11,360,188 | B2 | 6/2022 | Leabman |
| 11,367,525 | B2 | 6/2022 | Addison et al. |
| 11,389,093 | B2 | 7/2022 | Triman et al. |
| 11,426,104 | B2 | 8/2022 | Schurman et al. |
| 2003/0036713 | A1 | 2/2003 | Bouton et al. |
| 2004/0065158 | A1 | 4/2004 | Schrepfer et al. |
| 2004/0127777 | A1 | 7/2004 | Ruchti et al. |
| 2004/0133086 | A1 | 7/2004 | Ciurczak et al. |
| 2005/0203387 | A1* | 9/2005 | Godshalk .............. A61B 5/05 600/430 |
| 2009/0275814 | A1 | 11/2009 | Watanabe et al. |
| 2010/0041969 | A1 | 2/2010 | Beise |
| 2011/0028814 | A1 | 2/2011 | Petersen et al. |
| 2014/0213870 | A1 | 7/2014 | Hsu et al. |
| 2016/0051171 | A1 | 2/2016 | Pikov et al. |
| 2017/0095667 | A1 | 4/2017 | Yakovlev et al. |
| 2018/0028824 | A1 | 2/2018 | Pivonka et al. |
| 2019/0008422 | A1 | 1/2019 | Leath et al. |
| 2019/0053741 | A1 | 2/2019 | Chaudhry |
| 2019/0104939 | A1 | 4/2019 | Costantine et al. |
| 2019/0269853 | A1 | 9/2019 | Doyle et al. |
| 2019/0353752 | A1 | 11/2019 | Lin et al. |
| 2019/0357800 | A1 | 11/2019 | Bosua |
| 2019/0388000 | A1 | 12/2019 | Costantine et al. |
| 2020/0054255 | A1 | 2/2020 | Conrad et al. |
| 2020/0057163 | A1 | 2/2020 | Bromberg |
| 2020/0146584 | A1 | 5/2020 | Bosua |
| 2020/0187791 | A1 | 6/2020 | Leabman |
| 2020/0187792 | A1 | 6/2020 | Leabman |
| 2020/0187793 | A1 | 6/2020 | Leabman |
| 2020/0187812 | A1 | 6/2020 | Leabman |
| 2020/0187813 | A1 | 6/2020 | Leabman |
| 2020/0187814 | A1 | 6/2020 | Leabman |
| 2020/0187815 | A1 | 6/2020 | Leabman |
| 2020/0187816 | A1 | 6/2020 | Leabman |
| 2020/0187817 | A1 | 6/2020 | Leabman |
| 2020/0187818 | A1 | 6/2020 | Leabman |
| 2020/0187819 | A1 | 6/2020 | Leabman |
| 2020/0187820 | A1 | 6/2020 | Leabman |
| 2020/0187836 | A1 | 6/2020 | Leabman |
| 2020/0187837 | A1 | 6/2020 | Leabman |
| 2020/0187867 | A1 | 6/2020 | Leabman |
| 2020/0191909 | A1 | 6/2020 | Leabman |
| 2020/0191932 | A1 | 6/2020 | Leabman |
| 2020/0191933 | A1 | 6/2020 | Leabman |
| 2020/0191944 | A1 | 6/2020 | Leabman |
| 2020/0191945 | A1 | 6/2020 | Leabman |
| 2020/0191947 | A1 | 6/2020 | Leabman |
| 2020/0192426 | A1 | 6/2020 | Leabman |
| 2020/0192427 | A1 | 6/2020 | Leabman |
| 2020/0192428 | A1 | 6/2020 | Leabman |
| 2020/0193326 | A1 | 6/2020 | Leabman |
| 2020/0195197 | A1 | 6/2020 | Leabman |
| 2020/0195293 | A1 | 6/2020 | Leabman |
| 2022/0015695 | A1 | 1/2022 | Margarito et al. |
| 2022/0031254 | A1 | 2/2022 | Al-Ali et al. |
| 2022/0192494 | A1 | 6/2022 | Leabman |
| 2022/0192531 | A1 | 6/2022 | Leabman |
| 2022/0248984 | A1 | 8/2022 | Poeze et al. |

FOREIGN PATENT DOCUMENTS

| | | |
|---|---|---|
| JP | 2012125382 | 7/2012 |
| KR | 1020160081740 | 7/2016 |
| WO | 2017163245 | 9/2017 |
| WO | 2019071138 | 4/2019 |
| WO | 2019198567 | 10/2019 |
| WO | 2019217461 | 11/2019 |
| WO | 2020006077 | 1/2020 |
| WO | 2020037171 | 2/2020 |
| WO | 2021198045 A1 | 10/2021 |
| WO | 2022026623 A1 | 2/2022 |

OTHER PUBLICATIONS

"Contributes to longer healthy life expectancy with non-invasive vital acquisition sensor," Quantum Operation Co., Ltd., presentation found on Jan. 12, 2021 at https://oi.nttdata.com/program/forum/history/20191118/pdf/03_quantum-op.pdf (14 pages including English translation).

International Search Report and Written Opinion for PCT/US2019/031176, mailed Aug. 23, 2019, 9 pages.

Qiang et al., "Quantitative detection of glucose level based on radiofrequency patch biosensor combined with volume-fixed structures," Biosensors and Bioelectronics 98:357-363, 2017.

U.S. Appl. No. 17/123,947, titled "Non-Invasive Detection of an Analyte Using Decoupled Transmit and Receive Antennas," filed Dec. 16, 2020 (46 pages).

U.S. Appl. No. 17/123,977, titled "Non-Invasive Detection of an Analyte Using Decoupled and Inefficient Transmit and Receive Antennas," filed Dec. 16, 2020 (47 pages).

U.S. Appl. No. 17/123,992, titled "Non-Invasive Analyte Sensor Device," filed Dec. 16, 2020 (47 pages).

Shaker, G. et al., "Non-Invasive Monitoring of Glucose Level Changes Utilizing a mm-Wave Radar System," IJMHCI, vol. 10, Issue 3 (2018): pp. 10-29.

Lien, J. et al., "Soli: Ubiquitous Gesture Sensing with Millimeter Wave Radar," ACM Trans. Graph., vol. 35, No. 4, Article 142, 19 pages (Jul. 2016).

International Search Report and Written Opinion issued for International Patent Application No. PCT/IB2020/062222, Date of mailing: Mar. 25, 2021, 7 pages.

* cited by examiner

IN VITRO ANALYTE SENSOR USING ONE OR MORE DETECTOR ARRAYS THAT OPERATE IN RADIO/MICROWAVE FREQUENCY BANDS

FIELD

This technical disclosure relates generally to apparatus, systems and methods that perform detection of one or more analytes in an in vitro sample via spectroscopic techniques using non-optical frequencies such as in the radio or microwave frequency bands of the electromagnetic spectrum.

BACKGROUND

There is interest in being able to detect and/or measure an analyte within a target. One non-limiting example is measuring glucose in biological tissue. U.S. Pat. No. 10,548,503 discloses an example of the use of radio or microwave frequency bands of the electromagnetic spectrum in in vivo medical diagnostics.

SUMMARY

This disclosure relates generally to apparatus, systems and methods of detecting an analyte in an in vitro sample via spectroscopic techniques using non-optical frequencies that are in the radio or microwave frequency bands of the electromagnetic spectrum. An analyte sensor described herein uses at least one transmit antenna (which may also be referred to as a transmit element) that functions to transmit a signal in a radio or microwave frequency band of the electromagnetic spectrum into an in vitro sample containing an analyte of interest, and at least one receive antenna (which may also be referred to as a receive element) that functions to detect a response resulting from transmission of the transmit signal by the transmit antenna into the sample.

An analyte sensor described herein includes an antenna array having at least two antennas. In one embodiment, the antenna array can have at least three antennas. In still another embodiment, the antenna array can have at least six antennas. Any one or more of the antennas in the antenna array can be selectively controlled to function as the transmit antenna. In addition, any one or more of the antennas in the antenna array can be selectively controlled to function as the receive antenna. A scan routine can be implemented that includes a plurality of scans, where each scan uses a different combination of the antennas to transmit a signal and detect a response. In the following description, an antenna that is controlled to function as a transmit antenna may simply be referred to as a transmit antenna, while an antenna that is controlled to function as a receive antenna may simply be referred to as a receive antenna.

In one embodiment, the antennas, whether functioning as a transmit antenna or as a receive antenna, may be decoupled from one another which helps to improve the detection capability of the analyte sensor. However, in some embodiments, the detector elements/antennas are not decoupled from one another. The decoupling between the transmit and receive antennas can be achieved using any one or more techniques that causes as much of the signal as possible that is transmitted by the transmit antenna to enter the sample and that minimizes or even eliminates the amount of electromagnetic energy that is directly received by the receive antenna from the transmit antenna without traveling into the sample. The decoupling can be achieved by one or more intentionally fabricated configurations and/or arrangements between the transmit and receive antennas that is sufficient to decouple the transmit and receive antennas from one another. In one non-limiting embodiment, the decoupling can be achieved by the transmit antenna and the receive antenna having intentionally different geometries from one another. Intentionally different geometries refers to different geometric configurations of the transmit and receive antennas that are intentional, and is distinct from differences in geometry of transmit and receive antennas that may occur by accident or unintentionally, for example due to manufacturing errors or tolerances.

Another technique to achieve decoupling of the transmit and receive antennas is to use an appropriate spacing between each antenna, depending upon factors such as output power, size of the antennas, frequency, and the presence of any shielding, so as to force a proportion of the electromagnetic lines of force of the transmit signal into the sample so they reach the analyte, thereby minimizing or eliminating as much as possible direct receipt of electromagnetic energy by the receive antenna directly from the transmit antenna without traveling into the sample. This technique helps to ensure that the response detected by the receive antenna is measuring the analyte and is not just the transmitted signal flowing directly from the transmit antenna to the receive antenna. In one embodiment, the sensor can use a first pair of transmit and receive antennas that have a first spacing therebetween, and a second pair of transmit and receive antennas that have a second spacing therebetween that differs from the first spacing.

The techniques described herein can be used to detect the presence of the analyte of interest, as well an amount of the analyte or a concentration of the analyte within the in vitro sample. The techniques described herein can be used to detect a single analyte or more than one analyte. The sample can be any in vitro sample, for example human or non-human, animal or non-animal, biological or non-biological, that contains the analyte(s) that one may wish to detect. For example, the sample can include, but is not limited to, human tissue, animal tissue, plant tissue, an inanimate object, soil, a fluid, genetic material, or a microbe. The analyte(s) can be any analyte, for example human or non-human, animal or non-animal, biological or non-biological, that one may wish to detect. For example, the analyte(s) can include, but is not limited to, one or more of blood glucose, blood alcohol, white blood cells, or luteinizing hormone. As used herein the term fluid is intended to encompass gas, liquid and mixtures of gas and liquid.

In one embodiment, an analyte sensor can include a housing, a sample chamber in the housing where the sample chamber is configured to receive a container at least partially therein that contains a sample, and at least one detector array mounted in the housing adjacent to and facing the sample chamber. The at least one detector array has two or more detector elements, with at least one of the detector elements of the two or more detector elements operating as a transmit element and at least one of the detector elements of the two or more detector elements operating as a receive element. The transmit element is positioned and arranged to transmit a signal that is in a radio or microwave frequency range of the electromagnetic spectrum into the sample chamber and into the sample contained in the container, and the receive element is positioned and arranged to detect a response resulting from transmission of the signal by the transmit element into the sample chamber and into the sample contained in the container. A transmit circuit is electrically connectable to the transmit element, where the transmit circuit is configured to generate the signal to be transmitted by the transmit element. In addition, a receive circuit is electrically connectable to the receive element, where the receive circuit is configured to receive a response detected by the receive element.

In general, the closer the at least one detector array is to the sample chamber and to the sample the better. As described further below, the at least one detector array can be positioned inside the sample chamber, or just outside the sample chamber. In some embodiments, the analyte sensor may include suitably located RF shielding to shield the at least one detector array from outside or ambient RF interference. For example, the RF shielding can be located around the sample chamber, or located on the wall(s) of the housing.

In another embodiment, an analyte sensor can include a housing, a sample chamber in the housing where the sample chamber is configured to receive a container at least partially therein that contains a sample containing at least one analyte of interest, and an antenna array mounted in the housing adjacent to the sample chamber. The antenna array has two or more antenna elements facing toward the sample chamber, with at least one of the antenna elements of the two or more antenna elements operating as a transmit antenna to transmit a signal that is in a radio or microwave frequency range of the electromagnetic spectrum into the sample chamber and into the sample contained in the container, and with at least one of the antenna elements of the two or more antenna elements operating as a receive antenna to detect a response resulting from transmission of the signal by the transmit antenna into the sample chamber and into the sample contained in the container. A transmit circuit is electrically connectable to the transmit antenna, where the transmit circuit is configured to generate the signal to be transmitted by the transmit antenna. In addition, a receive circuit is electrically connectable to the receive antenna, where the receive circuit is configured to receive a response detected by the receive antenna.

DRAWINGS

Like reference numbers represent like parts throughout.

DETAILED DESCRIPTION

The following is a detailed description of apparatus, systems and methods of detecting an analyte in an in vitro sample loaded in an analyte sensor that uses spectroscopic techniques employing non-optical frequencies that are in the radio or microwave frequency bands of the electromagnetic spectrum, for example about 10 kHz to about 100 GHz. An analyte sensor described herein uses at least one transmit antenna (which may also be referred to as a transmit element) that functions to transmit one or more signals in the radio or microwave frequency band of the electromagnetic spectrum into the in vitro sample containing an analyte of interest, and at least one receive antenna (which may also be referred to as a receive element) that functions to detect a response resulting from transmission of the transmit signal(s) by the transmit antenna into the sample.

The transmit antenna and the receive antenna can be located in the analyte sensor so as to be near the sample and operated as further described herein to assist in detecting at least one analyte in the sample. The transmit antenna transmits at least one signal, which can have at least two frequencies in the radio or microwave frequency range, toward and into the sample. The signal can be formed by separate signal portions, each having a discrete frequency, that are transmitted separately at separate times at each frequency. In another embodiment, the signal may be part of a complex signal that includes a plurality of frequencies including the at least two frequencies. The complex signal can be generated by blending or multiplexing multiple signals together followed by transmitting the complex signal whereby the plurality of frequencies are transmitted at the same time. One possible technique for generating the complex signal includes, but is not limited to, using an inverse Fourier transformation technique. The receive antenna detects a response resulting from transmission of the signal by the transmit antenna into the sample containing the at least one analyte of interest.

In one embodiment, the transmit antenna and the receive antenna may be decoupled (which may also be referred to as detuned or the like) from one another. Decoupling refers to intentionally fabricating the configuration and/or arrangement of the transmit antenna and the receive antenna to minimize direct communication between the transmit antenna and the receive antenna, preferably absent shielding. Shielding between the transmit antenna and the receive antenna can be utilized. However, the transmit antenna and the receive antenna are decoupled even without the presence of shielding. In some embodiments, the transmit and receive antennas are not decoupled from one another.

The signal(s) detected by the receive antenna can be analyzed to detect the analyte based on the intensity of the received signal(s) and reductions in intensity at one or more frequencies where the analyte absorbs the transmitted signal. An example of detecting an analyte using a non-invasive spectroscopy sensor operating in the radio or microwave frequency range of the electromagnetic spectrum is described in U.S. Pat. No. 10,548,503 and WO 2019/217461, the entire contents of each are incorporated herein by reference. The signal(s) detected by the receive antenna can be complex signals including a plurality of signal components, each signal component being at a different frequency. In an embodiment, the detected complex signals can be decomposed into the signal components at each of the different frequencies, for example through a Fourier transformation. In an embodiment, the complex signal detected by the receive antenna can be analyzed as a whole (i.e. without demultiplexing the complex signal) to detect the analyte as long as the detected signal provides enough information to make the analyte detection. In addition, the signal(s) detected by the receive antenna can be separate signal portions, each having a discrete frequency.

The analyte(s) can be any analyte that one may wish to detect. The analyte can be human or non-human, animal or non-animal, biological or non-biological. For example, the analyte(s) can include, but is not limited to, one or more of blood glucose, blood alcohol, white blood cells, or luteinizing hormone. The analyte(s) can include, but is not limited to, a chemical, a combination of chemicals, a virus, a bacteria, or the like. The analyte can be a chemical included in another medium, with non-limiting examples of such media including a fluid containing the at least one analyte, for example blood, interstitial fluid, cerebral spinal fluid, lymph fluid or urine, human tissue, animal tissue, plant tissue, an inanimate object, soil, genetic material, or a microbe. The analyte(s) may also be a non-human, non-biological particle such as a mineral or a contaminant.

The analyte(s) can include, for example, naturally occurring substances, artificial substances, metabolites, and/or reaction products. As non-limiting examples, the at least one analyte can include, but is not limited to, insulin, acarboxy-prothrombin; acylcarnitine; adenine phosphoribosyl transferase; adenosine deaminase; albumin; alpha-fetoprotein; amino acid profiles (arginine (Krebs cycle), histidine/urocanic acid, homocysteine, phenylalanine/tyrosine, tryptophan); andrenostenedione; antipyrine; arabinitol enantiomers; arginase; benzoylecgonine (cocaine); biotinidase; biopterin; c-reactive protein; carnitine; pro-BNP; BNP; troponin; carnosinase; CD4; ceruloplasmin; chenodeoxycholic acid; chloroquine; cholesterol; cholinesterase; conjugated 1-β hydroxy-cholic acid; cortisol; creatine kinase; creatine kinase MM isoenzyme; cyclosporin A; d-penicillamine; de-ethylchloroquine; dehydroepiandrosterone sulfate; DNA (acetylator polymorphism, alcohol dehydrogenase, alpha 1-antitrypsin, cystic fibrosis, Duchenne/Becker muscular dystrophy, analyte-6-phosphate dehydrogenase, hemoglobin A, hemoglobin S, hemoglobin C, hemoglobin D, hemoglobin E, hemoglobin F, D-Punjab, beta-thalassemia, hepatitis B virus, HCMV, HIV-1, HTLV-1, Leber hereditary optic neuropathy, MCAD, RNA, PKU, *Plasmodium vivax*, sexual differentiation, 21-deoxycortisol); desbutylhalofantrine; dihydropteridine reductase; diptheria/tetanus antitoxin; erythrocyte arginase; erythrocyte protoporphyrin; esterase D; fatty acids/acylglycines; free β-human chorionic gonadotropin; free erythrocyte porphyrin; free thyroxine (FT4); free tri-iodothyronine (FT3); fumarylacetoacetase; galactose/gal-1-phosphate; galactose-1-phosphate uridyltransferase; gentamicin; analyte-6-phosphate dehydrogenase; glutathione; glutathione peroxidase; glycocholic acid; glycosylated hemoglobin; halofantrine; hemoglobin variants; hexosaminidase A; human erythrocyte carbonic anhydrase I; 17-alpha-hydroxyprogesterone; hypoxanthine phosphoribosyl transferase; immunoreactive trypsin; lactate; lead; lipoproteins ((a), B/A-1, β); lysozyme; mefloquine; netilmicin; phenobarbitone; phenytoin; phytanic/pristanic acid; progesterone; prolactin; prolidase; purine nucleoside phosphorylase; quinine; reverse tri-iodothyronine (rT3); selenium; serum pancreatic lipase; sissomicin; somatomedin C; specific antibodies (adenovirus, anti-nuclear antibody, anti-zeta antibody, arbovirus, Aujeszky's disease virus, dengue virus, *Dracunculus medinensis, Echinococcus granulosus, Entamoeba histolytica*, enterovirus, *Giardia duodenalisa, Helicobacter pylori*, hepatitis B virus, herpes virus, HIV-1, IgE (atopic disease), influenza virus, *Leishmania donovani*, leptospira, measles/mumps/rubella, *Mycobacterium leprae, Mycoplasma pneumoniae, Myoglobin, Onchocerca volvulus*, parainfluenza virus, *Plasmodium falciparum*, polio virus, *Pseudomonas aeruginosa*, respiratory syncytial virus, rickettsia (scrub typhus), *Schistosoma mansoni, Toxoplasma gondii, Trepenoma pallidium, Trypanosoma cruzi*/rangeli, vesicular *stomatis* virus, *Wuchereria bancrofti*, yellow fever virus); specific antigens (hepatitis B virus, HIV-1); succinylacetone; sulfadoxine; theophylline; thyrotropin (TSH); thyroxine (T4); thyroxine-binding globulin; trace elements; transferrin; UDP-galactose-4-epimerase; urea; uroporphyrinogen I synthase; vitamin A; white blood cells; and zinc protoporphyrin.

The analyte(s) can also include one or more chemicals introduced into the sample. The analyte(s) can include a marker such as a contrast agent, a radioisotope, or other chemical agent. The analyte(s) can include a fluorocarbon-based synthetic blood. The analyte(s) can include a drug or pharmaceutical composition, with non-limiting examples including ethanol; *cannabis* (marijuana, tetrahydrocannabinol, hashish); inhalants (nitrous oxide, amyl nitrite, butyl nitrite, chlorohydrocarbons, hydrocarbons); cocaine (crack cocaine); stimulants (amphetamines, methamphetamines, Ritalin, Cylert, Preludin, Didrex, PreState, Voranil, Sandrex, Plegine); depressants (barbiturates, methaqualone, tranquilizers such as Valium, Librium, Miltown, Serax, Equanil, Tranxene); hallucinogens (phencyclidine, lysergic acid, mescaline, peyote, psilocybin); narcotics (heroin, codeine, morphine, opium, meperidine, Percocet, Percodan, Tussionex, Fentanyl, Darvon, Talwin, Lomotil); designer drugs (analogs of fentanyl, meperidine, amphetamines, methamphetamines, and phencyclidine, for example, Ecstasy); anabolic steroids; and nicotine. The analyte(s) can include other drugs or pharmaceutical compositions. The analyte(s) can include neurochemicals or other chemicals generated within the body, such as, for example, ascorbic acid, uric acid, dopamine, noradrenaline, 3-methoxytyramine (3MT), 3,4-Dihydroxyphenylacetic acid (DOPAC), Homovanillic acid (HVA), 5-Hydroxytryptamine (5HT), and 5-Hydroxyindoleacetic acid (FHIAA).

Figure 1:
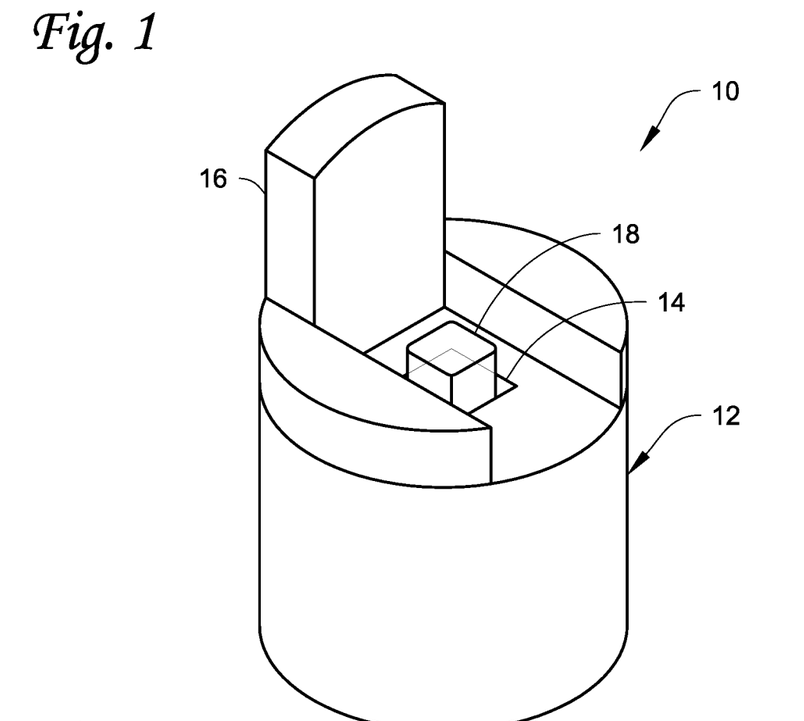
FIG. 1 illustrates an example of an analyte sensor described herein with the lid open and a container that contains a sample disposed in the sample chamber.
Figure 2:
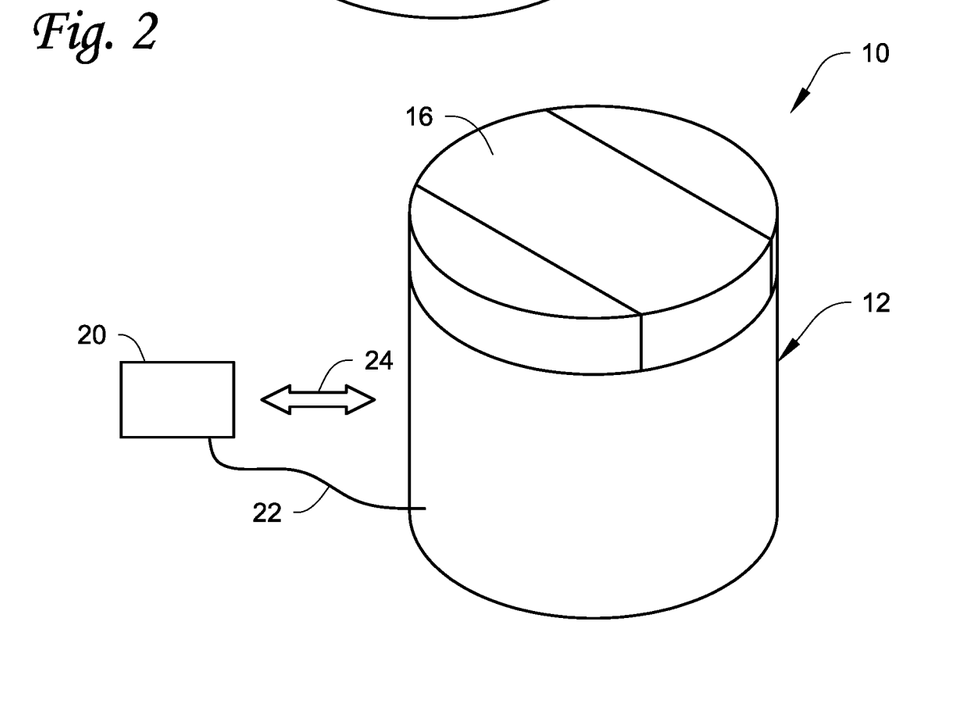
FIG. 2 illustrates the analyte sensor of FIG. 1 with the lid closed.

Referring initially to FIGS. 1 and 2, an example embodiment of an analyte sensor 10 described herein is illustrated. As described in further detail below, the analyte sensor 10 is configured to utilize spectroscopic techniques employing non-optical frequencies that are in the radio or microwave frequency bands of the electromagnetic spectrum for use in detecting one or more analytes in an in vitro sample that is loaded into the analyte sensor 10. The analyte sensor 10 includes a housing 12 which can have any configuration. The housing 12 defines at least one sample chamber 14 therein that is configured to receive an in vitro sample for testing. In some embodiments a single sample chamber 14 can be provided or multiple sample chambers 14 can be provided. The sample chamber 14 can be located at any position in the housing 12 and can be accessed in any suitable manner to allow loading and unloading of the sample. In the illustrated example, the sample chamber 14 is located centrally in the housing 12 and is accessed via the top of the housing 12. The housing 12 can include a hinged lid 16 which can be opened and closed to control access to the sample chamber 14.

Figure 3A:
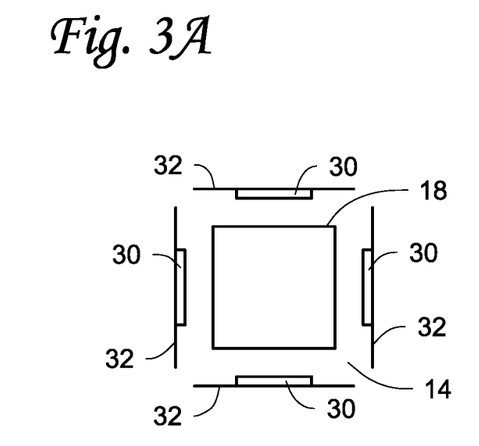
FIGS. 3A, 3B, 3C and 3D are top, schematic views of different examples of sample chambers and one or more antenna/element arrays of the sample chambers.
Figure 3B:
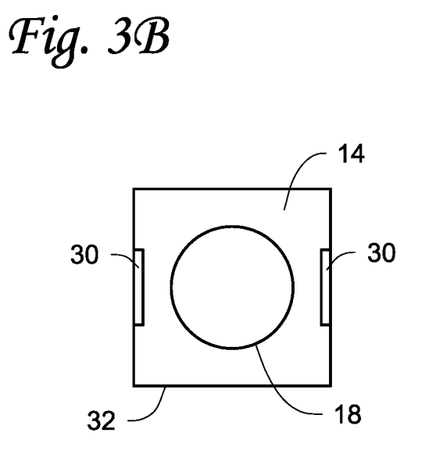
Figure 3C:
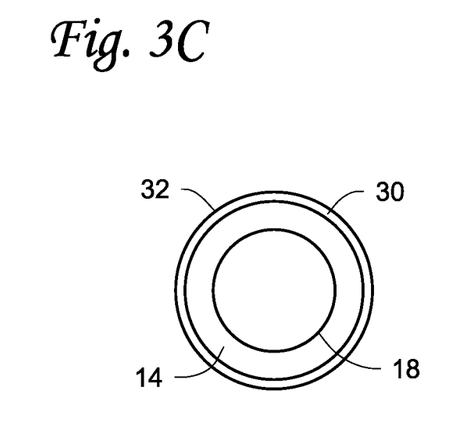
Figure 3D:
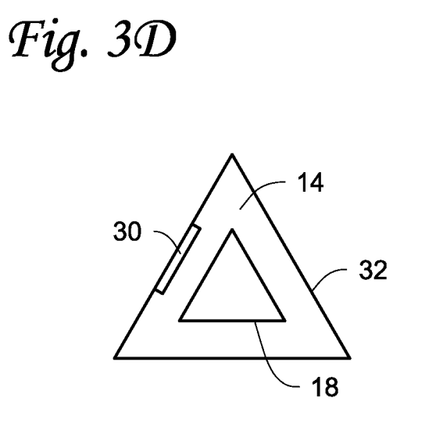

The sample chamber 14 is configured to removably receive and hold a container 18 at least partially therein that is configured to contain the sample during a test. The sample chamber 14 and the container 18 can have any configurations suitable for performing the functions of the sample chamber 14 and the container 18. The sample chamber 14 holds the container 18 during a test. The container 18 has a configuration that is suitable for containing a sample during operation of the sensor 10 and that permits travel of electromagnetic waves that are in the radio or microwave frequency bands of the electromagnetic spectrum through at least one wall thereof into and from the sample. In one embodiment, the container 18 can be a cuvette made of glass or plastic. The sample chamber 14 can be square, rectangular, round, triangular or other shape in cross-section. The container 18 can be square, rectangular, round, triangular or other shape in cross-section. FIG. 3A illustrates an example where the sample chamber 14 and the container 18 are each generally square or rectangular in cross-section. FIG. 3B illustrates an example where the sample chamber 14 is square or rectangular in cross-section, and the container 18 is round in cross-section. FIG. 3C illustrates an example where the sample chamber 14 and the container 18 are round in cross-section. FIG. 3D illustrates an example where the sample chamber 14 and the container 18 are each triangular in cross-section. Many other shapes and combinations of shapes for the sample chamber 14 and the container 18 are possible.

In addition to the features described above, the housing 12 can include additional features that are similar to the features of the housing disclosed in U.S. Pat. No. 9,041,920 the entire contents of which are incorporated herein by reference.

The container 18 can be automatically loaded into and/or removed from the sample chamber 14 using an automated mechanical loading/unloading system, or the container 18 can be manually loaded into and/or removed from the sample chamber 14.

In one embodiment, the analyte sensor 10 can be used to obtain data, with analysis of the data for detecting the presence of the analyte of interest, as well an amount of the analyte or a concentration of the analyte within the in vitro sample, occurring remotely from the analyte sensor 10. For example, with reference to FIG. 2, an external data analyzing device 20 can be in communication with the analyte sensor 10 to receive data therefrom for subsequent analysis of the data. The device 20 can be a mobile phone (a.k.a. cell phone, smartphone); a tablet computer; a laptop computer; a personal computer; and a use specific analysis device similar to these devices that is specifically designed to function with the sensor 10. Additional example of devices or systems that can be used to analyze the data include, but are not limited to, hardware-based computing devices or systems; cloud-based computing devices or systems; machine learning devices or systems including active learning devices or systems; artificial intelligence-based devices or systems; neural network-based devices or systems; combinations thereof; and any other types of devices and systems that are suitable for analyzing the data. Communication between the device 20 and the sensor 10 can be via a wired connection 22 or via wireless communication 24 using suitable wireless communication devices on the sensor 10 and the device 20. Data can also be downloaded from the sensor 10 onto a portable storage device, such as a thumb drive (also known as a flash drive, USB flash drive, data stick, pen drive, jump drive, and the like) which is then plugged into or otherwise interfaced with the device 20 to transfer the data from the portable storage device onto the device 20 for analysis. In another embodiment, analysis of the data obtained by the sensor 10 can occur on the analyte sensor 10 in which case the sensor 10 includes suitable data processing capability known in the art.

Referring to FIGS. 3A-D, at least one detector array 30 is mounted in the housing 12 adjacent to the sample chamber 14, and therefore adjacent to the container 18 when the container 18 is installed in the chamber 14. The detector array 30 may also be referred to as an antenna array. Each detector array 30 may be mounted on a wall 32 of the housing 12, for example a wall that defines the sample chamber 14.

FIG. 3A depicts a number of the walls 32 that are separate from one another but which nonetheless serve to at least partially define the chamber 14. In addition, at least one of the detector arrays 30 is shown as being mounted on each wall 32 so that in this embodiment there are at least four of the detector arrays 30. However, a greater or lesser number of the detector arrays 30 can be provided. In addition, even if multiple detectors 30 are provided, any number of the detector arrays 30 can be used during a test on a sample.

FIG. 3B depicts an example of the wall 32 that is square or rectangular, and that is continuous and defines a continuous border of the chamber 14. In addition, two of the detector arrays 30 are shown as being mounted across from one another on opposite surfaces of the wall 32 so that in this embodiment there are at least two of the detector arrays 30. However, a greater or lesser number of the detector arrays 30 can be provided.

FIG. 3C depicts an alternative example of the wall 32 that is circular and that can also be continuous and defines a continuous border of the chamber 14. One or more of the detector arrays 30 can be mounted on the circular wall. This example illustrates the detector array 30 as being curved to generally match the curvature of the circular wall 32. The detector array 30 can extend partially around the chamber 14, or as illustrated, extend completely around the chamber 14 to encircle the chamber 14. The detector array in this embodiment can be formed in any suitable manner, for example by arranging the detector elements on a flexible substrate that can be wrapped around the chamber 14.

FIG. 3D another example of the wall 32 that is triangular, and that can be continuous and defines a continuous border of the chamber 14. This embodiment illustrates a single one of the detector arrays 30 as being mounted on the wall 32 so that in this embodiment there is at least one of the detector arrays 30. However, a greater number of the detector arrays 30 can be provided.

In general, the closer the detector array(s) 30 is to the sample chamber 14 and to the sample the better. In addition, the analyte sensor may include suitably located RF shielding to shield the detector array(s) 30 from outside or ambient RF interference. For example, the RF shielding can be located around the sample chamber 14 so that the RF shielding is between the detector array(s) 30 and ambient, or located on the exterior wall(s) of the housing.

Figure 4:
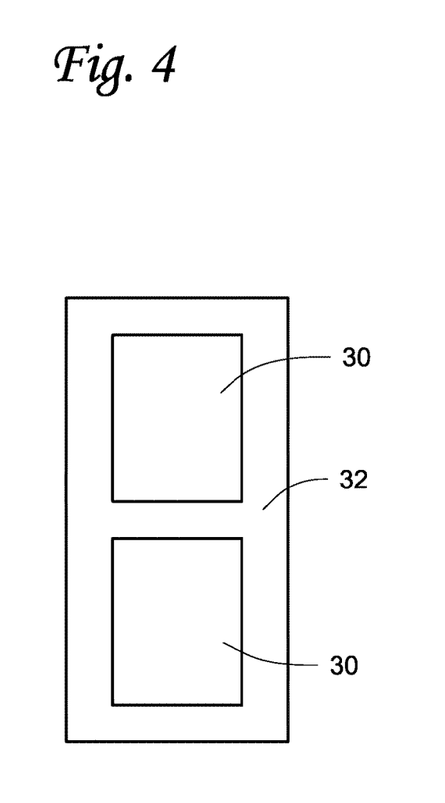
FIG. 4 is a side view of the sample chamber showing an example of one or more antenna/element arrays on one side of the sample chamber.

In addition, if multiple detector arrays 30 are provided, the detector arrays 30 may be vertically spaced from one another along a vertical height of the chamber 14 as depicted in FIG. 4. Although the detector array(s) 30 in FIGS. 3A-D are illustrated as being mounted on the inner surface of the wall 32, the detector array(s) 30 can be mounted on the outside surface(s) of the wall 32 or the detector array(s) 30 may not even be mounted on the wall 32. The detector array(s) 30 can be mounted at any location(s) in the housing 12 that permits the detector array(s) 30 to perform their functions described herein.

Each detector array 30 has two or more detector elements that face toward the sample chamber 18. At least one of the detector elements functions as a transmitter (i.e. as a transmit antenna) to transmit a signal that is in the radio or microwave frequency range of the electromagnetic spectrum into the sample chamber 14 and into the sample contained in the container 18. In addition, at least one of the detector elements functions as a receiver (i.e. as a receive antenna) to detect a response resulting from transmission of the signal by the transmit antenna into the sample chamber and into the sample contained in the container. The detector elements of the detector array(s) 30 can have any construction that is suitable for transmitting and receiving signals in the radio or microwave frequency range of the electromagnetic spectrum as described. For example, the detector array 30 can have detector/antenna elements as described in U.S. Pat. No. 10,548,503 and WO 2019/217461, the entire contents of each are incorporated herein by reference.

Figure 5:
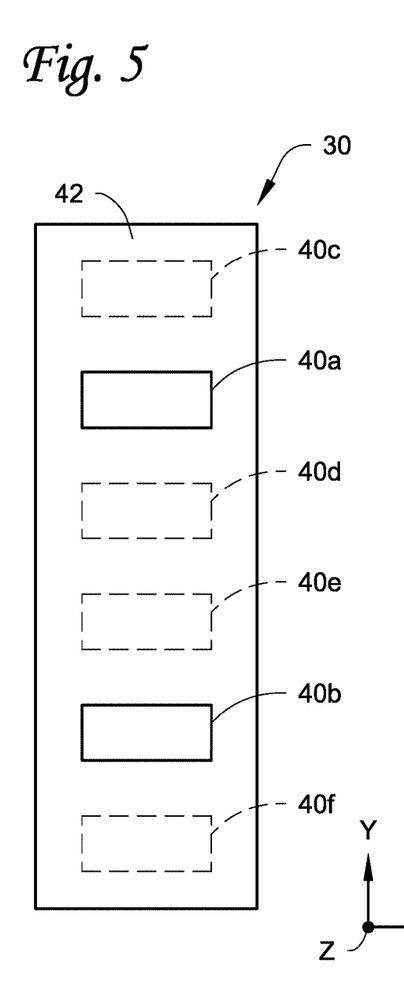
FIG. 5 is a schematic depiction of an antenna/element array that can be used with the analyte sensor.

FIG. 5 is a schematic depiction of an example of the detector array 30 that can be used with the analyte sensor 10. The array 30 includes at least two detector elements 40a, 40b disposed on a substrate 42 which may be substantially planar. The array 30 can optionally include one or more additional detector elements 40c, 40d, 40e, 40f illustrated in dashed lines. The array 30 can include at least two or more detector elements, at least three or more detector elements, or at least six or more detector elements. However, a different number of detector elements can be used.

Figure 6:
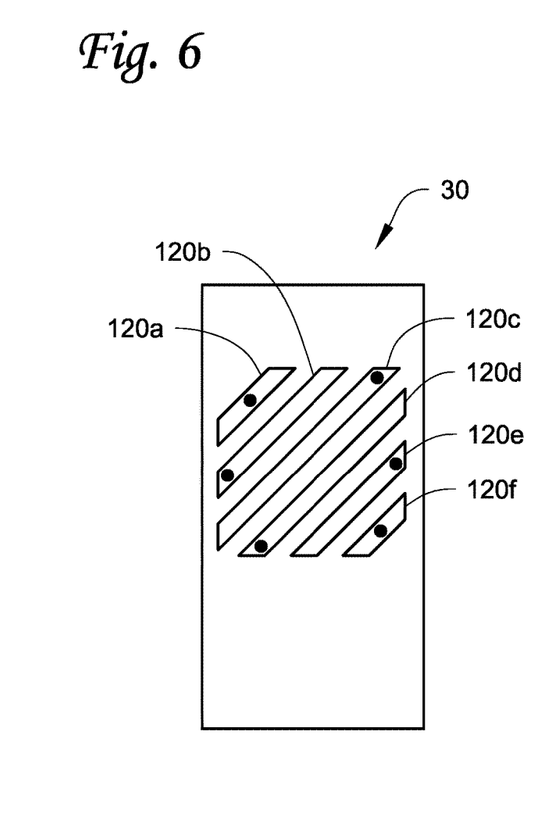
FIG. 6 illustrates an example of an antenna/element array that can be used with the analyte sensor.

In operation, one of the detector elements 40a, 40b operates as a transmit element/antenna, and the other detector element 40a, 40b operates as a receive element/antenna. The example in FIGS. 5-6 depict the array 30 disposed substantially in an X-Y plane. Dimensions of the detector elements 40a, 40b in the X and Y-axis directions can be considered lateral dimensions, while a dimension of the elements 40a, 40b in a Z-axis direction can be considered a thickness dimension. In this example, each of the elements 40a, 40b has at least one lateral dimension (measured in the X-axis direction and/or in the Y-axis direction) that is greater than the thickness dimension thereof (in the Z-axis direction extending into/out of the page). In other words, the elements 40a, 40b are each relatively flat or of relatively small thickness in the Z-axis direction compared to at least one other lateral dimension measured in the X-axis direction and/or in the Y-axis direction. The array 30 need not be oriented entirely within a plane such as the X-Y plane, the Y-Z plane or the X-Z plane. Instead, the array 30 can be disposed at angles to the X-Y plane, the Y-Z plane and the X-Z plane.

In addition, the detector elements are illustrated as having X and Y spacing from each other. However, the detector array 30 can be oriented in other planes and the detector elements can have X and Z spacing and Y and Z spacing from one another. In one embodiment, the detector array 30 could be 3 dimensional in which case the detector elements could have X, Y and Z spacing from one another.

Figure 7:
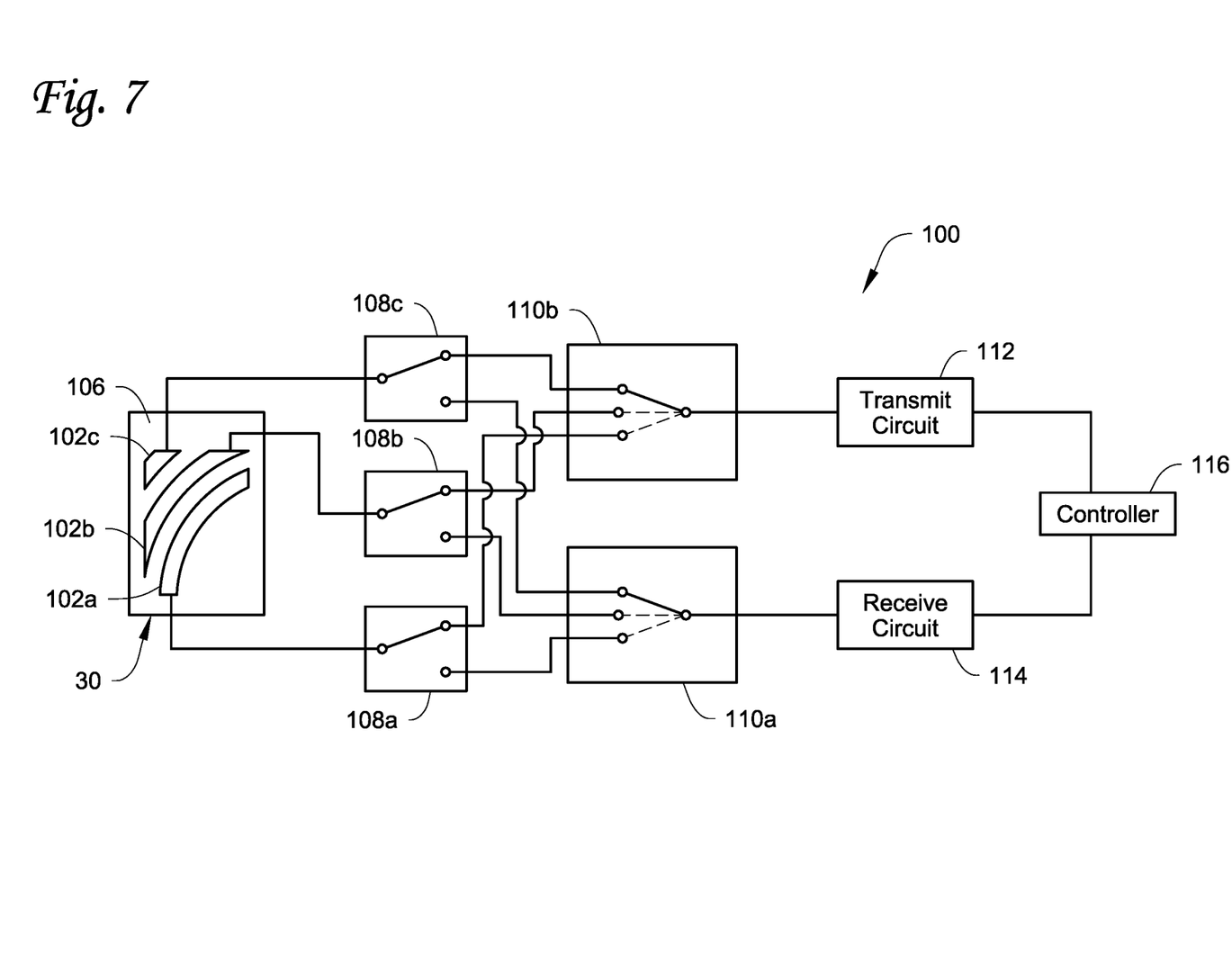
FIG. 7 a schematic depiction of an embodiment of control circuitry configured so that any detector element can be used as a transmit antenna or as a receive antenna.

FIG. 6 depicts an example of the detector array 30 with six detector elements/antennas 120a-f. However, the array 30 can use a smaller or larger number of antennas. In this example, the detector elements 120a-f are decoupled from one another because the geometry of each detector element is different than the other detector elements. FIG. 7 schematically depicts another embodiment of the detector array 30 having three detector elements.

Figure 9:
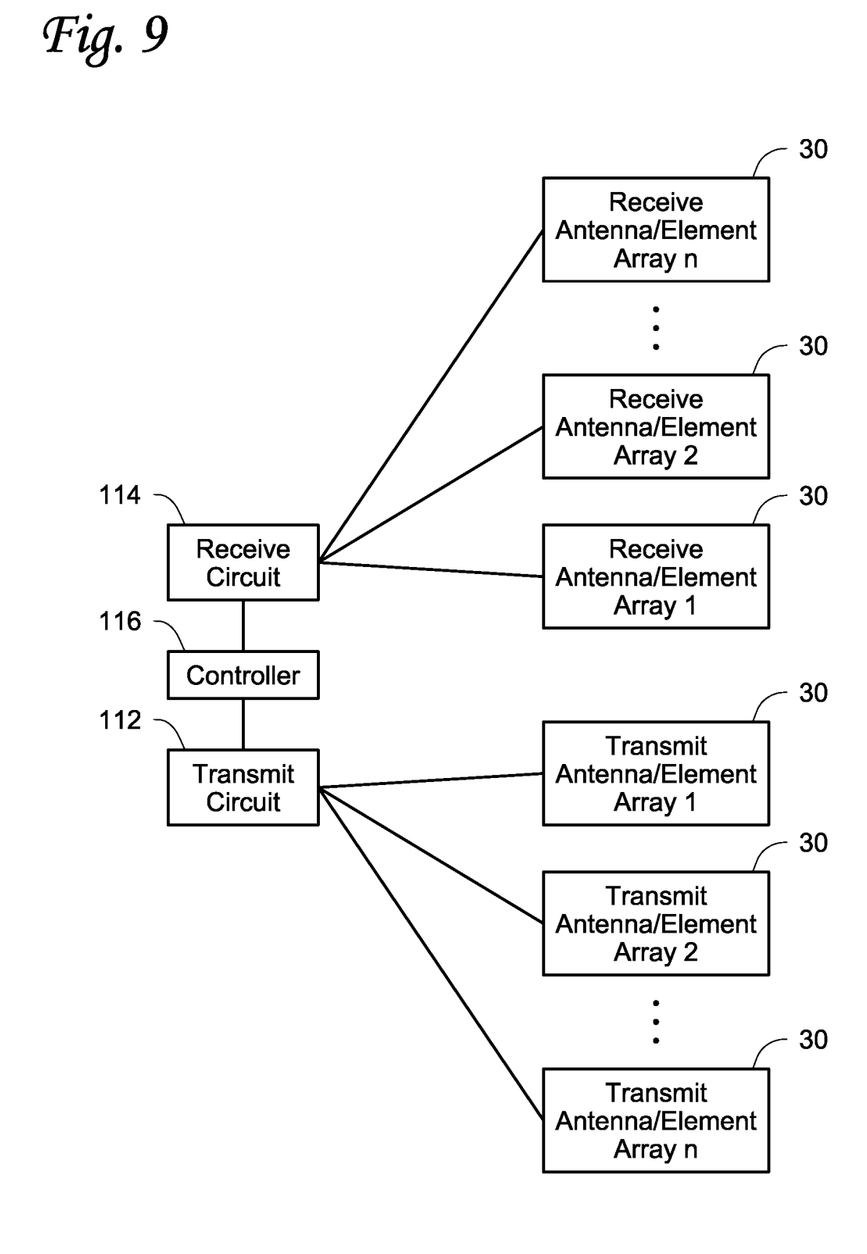
FIG. 9 is a schematic depiction of one example of a control circuit of the one or more antenna/element arrays.
Figure 10:
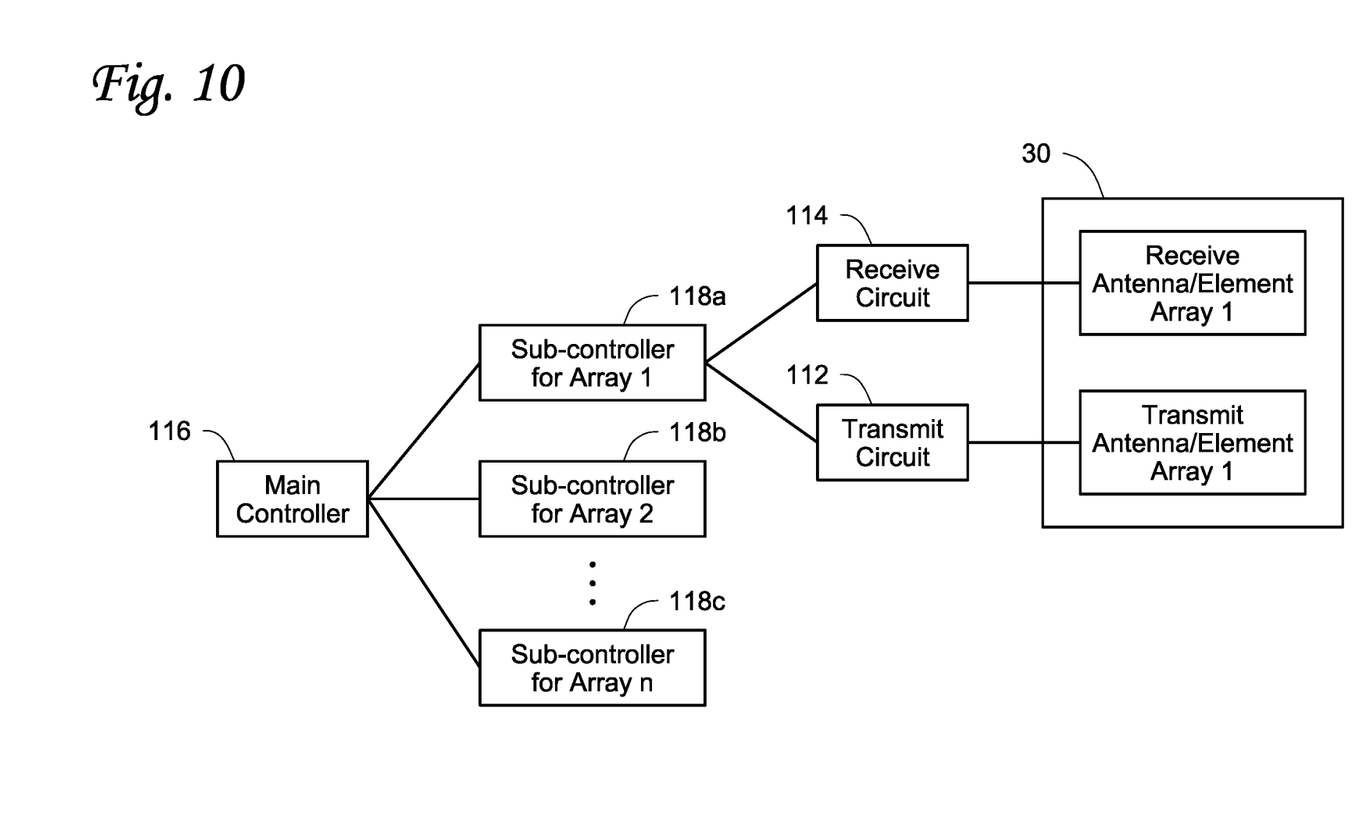
FIG. 10 is a schematic depiction of another example of a control circuit of the one or more antenna/element arrays.

In the sensor 10, in one embodiment each detector element can function as only a transmit antenna or only as a receive antenna (see FIGS. 9 and 10). In other embodiments, the sensor 10 can be configured such that any one or more of the detector elements can be used as either a transmit antenna or as a receive antenna. Such a system is illustrated in FIG. 7. In another embodiment, a scan routine can be implemented by the sensor 10 where the scan routine includes a plurality of scans, where each scan uses a different combination of the detector elements to transmit a signal and detect a response.

In the embodiment in FIG. 7, the array 30 has three detector elements 102a, 102b, 102c each of which can be disposed on a substrate 106 or disposed on separate substrates. The detector elements 102a, 102b, 102c can have a construction similar to the construction described above with respect to FIGS. 5-6. The detector elements 102a, 102b, 102c can have different geometries from each other, and the antennas 102a, 102b, 102c can be decoupled from each other. Switches 108a, 108b, 108c are electrically connected to each one of the detector elements 102a, 102b, 102c, and one or more transmit and receive switch controllers, such as a receive switch controller 110a and a transmit switch controller 110b separate from the receive switch controller 110a, with the switch controllers electrically connected to each of the switches 108a, 108b, 108c. The switches 108a, 108b, 108c can have any mechanical and/or electrical construction suitable for performing the functions of the switches 108a, 108b, 108c such as directing one or more transmit signals to the respective detector elements 102a, 102b, 102c or receiving a response detected by one or more of the other detector elements 102a, 102b, 102c. FIG. 7 illustrates the switches 108a, 108b, 108c as single pole, double throw switches, but other switch constructions can be used.

The switch controller(s) 110a, 110b can have any mechanical and/or electrical construction suitable for performing the functions of the switch controllers 110a, 110b, including controlling electrical connection of the transmit circuit 112 to any one or more of the detector elements 102a, 102b, 102c to direct a generated transmit signal to the desired detector element(s) to act as a transmit antenna and controlling electrical connection of the receive circuit 114 to one or more of the detector elements 102a, 102b, 102c to act as a receive antenna. The switch controllers 110a, 110b can be considered to have a transmit side that is suitable for controlling the transmit function, for example by suitably controlling the positions of the switches 108a, 108b, 108c to connect to the appropriate detector elements 102a, 102b, 102c and directing the transmit signal generated by a transmit circuit 112 to the appropriate detector element(s) 102a, 102b, 102c. The switch controllers 110a, 110b can also be considered to have a receive side that is suitable for controlling the receive function, for example by suitably controlling the positions of the switches 108a, 108b, 108c to connect to the appropriate detector element(s) 102a, 102b, 102c for receiving the response and directing the response to a receive circuit 114. The switch controllers 110a, 110b can have one or more controllers integrated therewith or suitably connected thereto for managing and controlling the control functions of the switch controllers 110a, 110b.

Control of the switch controllers 110a, 110b may alternatively be achieved using one or more other controllers of the sensor 10, for example a controller associated with the transmit circuit 112, a controller associated with the receive circuit 114, a main controller of the sensor 10, or one or more other controllers.

The transmit circuit 112 is configured to generate at least one transmit signal in the radio or microwave frequency range of the electromagnetic spectrum, for example about 10 kHz to about 100 GHz, to be transmitted into the sample containing the at least one analyte of interest by whichever detector elements 102a, 102b, 102c is/are acting as the transmit antenna as determined by the switch controller 110b. In addition, the receive circuit 114 is configured to receive a response detected by whichever detector elements 102a, 102b, 102c is/are acting as the receive antenna, where the response results from transmission of the at least one transmit signal into the sample. A main controller 116 is connected to the transmit circuit 112 to control generation of the transmit signal(s) by the transmit circuit 112. The controller 116 (or a separate controller) is also connected to the receive circuit 114 to control storage of the response(s) detected by the receive antenna in suitable storage/memory and/or to analyze the response(s).

In FIG. 7, one or more of the elements 108a, 108b, 108c, 112, 114 and 116 can be combined together functionally and/or mechanically rather than being separate elements. In addition, the transmit and receive switch controllers 110a, 110b can be combined into a single switch controller. In addition, communications between one or more of the elements 108a, 108b, 108c, 110a, 110b, 112, 114 and 116 can be achieved via wired connections and/or via wireless connections. Further, the operational positions of the switches 108a, 108b, 108c and the switch controllers 110a, 110b can be controlled using any suitable means, for example software and/or hardware, to ensure that at any moment in time, the switch controllers 110a, 110b are not connected to the same switch 108a, 108b, 108c at the same time. Moreover, when implementing a scan routine as described below, suitable techniques, such as the use of time stamps, can be used to differentiate between and/or identify the results of each scan, as well as indicate the frequency(ies) at which each scan was conducted.

The construction in FIG. 7 is such that a scan routine can be implemented where the scan routine includes a plurality of scans. In one scan of the scan routine, the detector element 102a can be used as the transmit antenna while the detector element 102c is used as the receive antenna. In another scan, the detector element 102a can be used as the transmit antenna while the detector element 102c is used as the receive antenna. Additional scans can be implemented using other combinations of the detector elements as transmits and receive antennas. The results of the scans can then be analyzed to determine the analyte, for example as described below, and optionally determine the amount of the analyte that is present.

The following table (Table 1) lists a portion of a scan routine showing some of the scans using different antenna combinations that can be implemented. The scan routine can include a larger or smaller number of scans, and other scans using different antenna combinations can be implemented.

TABLE 1

| Scan # | Tx antenna | Rx antenna |
|---|---|---|
| 1 | 102a | 102b |
| 2 | 102a | 102c |
| 3 | 102b | 102a |
| 4 | 102b | 102c |
| 5 | 102c | 102a |
| 6 | 102c | 102b |
| 7 | 102a + 102b | 102c |
| 8 | 102a | 102b + 102c |
| 9 | 102b + 102c | 102a |
| Etc. | Etc. | Etc. |

As indicated in Table 1, a single scan can use one detector element as a transmit antenna and one detector element as a receive antenna, or use two detector elements as transmit antennas and one detector element as a receive antenna, or use one detector element as a transmit antenna and two detector elements as receive antennas. In some embodiments, it is also possible that in a single scan, a detector element could be used as both a transmit antenna and as a receive antenna.

Table 2 below lists a portion of a scan routine using a detector array that has six detector elements 102a-f, showing some of the scans using different detector element combinations that can be implemented. The scan routine can include a larger or smaller number of scans, and other scans using different detector element combinations can be implemented. The results of the scans can then be analyzed to determine the analyte, for example as described above, and optionally determine the amount of the analyte that is present.

TABLE 2

| Scan # | Tx antenna | Rx antenna |
|---|---|---|
| 1 | 102a | 102b |
| 2 | 102b | 102c |
| 3 | 102b | 102d |
| 4 | 102c | 102f |
| 5 | 102e | 102a |
| 6 | 102f | 102b |
| 7 | 102a + 102b | 102c |
| 8 | 102a + 102b | 102c + 102d |
| 9 | 102a + 102c | 102f |
| 10 | 102a + 102c | 102b + 102d |
| 11 | 102b | 102a + 102f |
| Etc. | Etc. | Etc. |

As indicated in Table 2, a single scan can use one detector element as a transmit antenna and one detector element as a receive antenna, use two or more detector elements as transmit antennas and one detector element as a receive antenna, use one detector element as a transmit antenna and two or more detector elements as receive antennas, use two or more detector elements as transmit antennas and two or more detector elements as receive antennas, etc. In some embodiments, it is also possible that in a single scan, a detector element could be used as both a transmit antenna and as a receive antenna.

Figure 8:
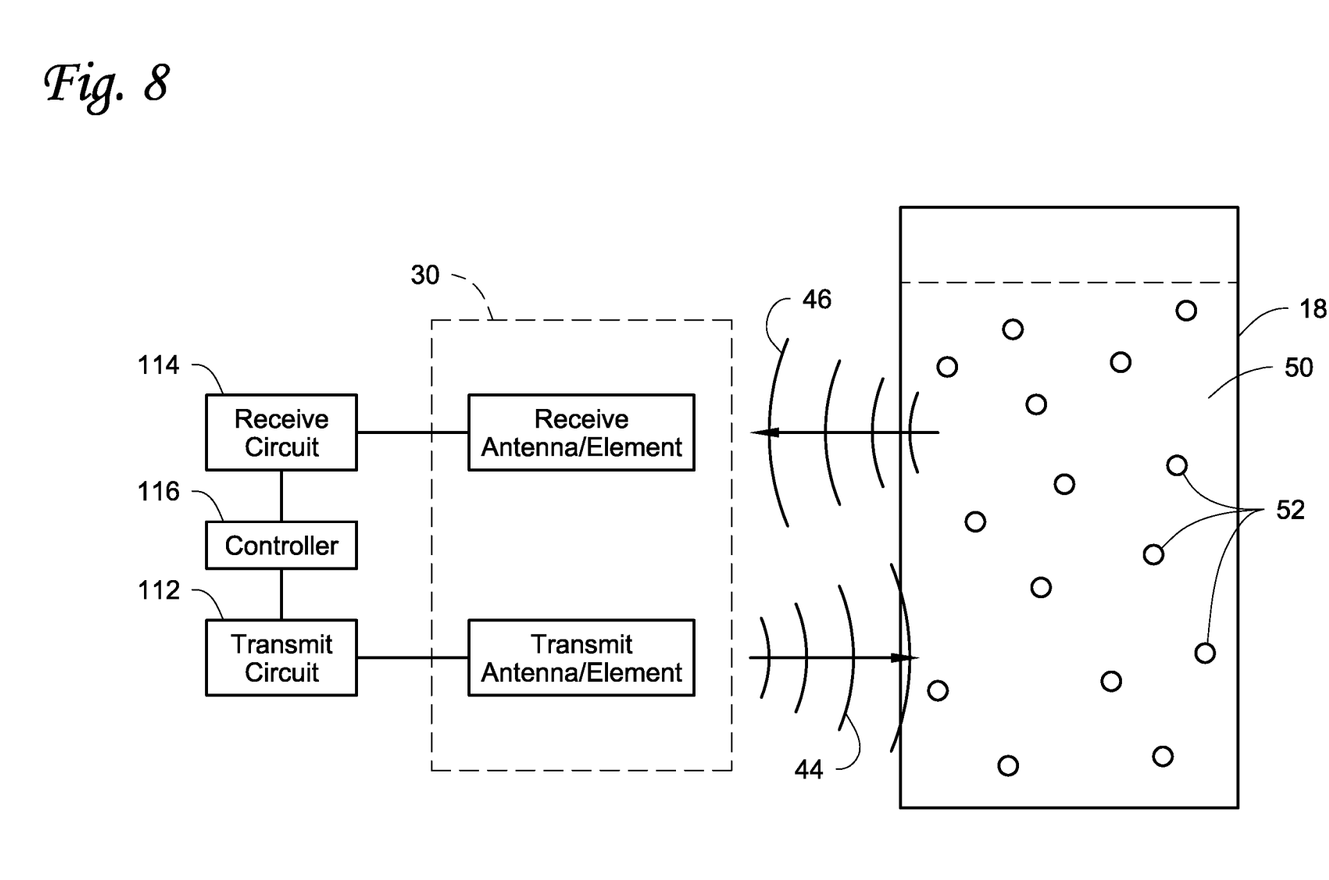
FIG. 8 is a schematic depiction of operation of the analyte sensor described herein.

In operation of the system in FIG. 7, and also referring to FIG. 8, a scan routine can implemented using the array 30. In a first scan, a first combination of two or more of the detector elements is used to transmit a first transmit signal 44 that is in a radio or microwave frequency range of the electromagnetic spectrum into the sample 50 containing at least one analyte of interest 52 and used to detect a response 46 resulting from transmission of the first transmit signal into the sample containing the at least one analyte of interest that is contained in the container 18. In a second scan, a second combination of two or more of the detector elements, different from the first combination, is used to transmit a second transmit signal 44 that is in a radio or microwave frequency range of the electromagnetic spectrum into the sample 50 containing the at least one analyte of interest 52 and used to detect the response 46 resulting from transmission of the second transmit signal into the sample containing the at least one analyte of interest. Depending upon the number of detector elements in the array, the scan routine can include additional scans using additional combinations of two or more of the detector arrays to transmit the transmit signal 44 and to detect a response 46.

The scan routine can be implemented at a number of discrete frequencies over a range of frequencies as described in U.S. Pat. No. 10,548,503 and WO 2019/217461, the entire contents of each are incorporated herein by reference. In the scan routine, for each scan at each frequency, a transmit signal can be transmitted by whichever detector element(s) is functioning as the transmit antenna and a response is detected a plurality of times, for example 20 times, at the detector element(s) that is functioning as the receive antenna. The detected responses can then be averaged to obtain the $S_{21}$ value.

FIG. 9 illustrates a control circuit where the transmit circuit 112 is used to control the transmit antenna(s) of multiple ones of the arrays 30. Similarly, the receive circuit 114 is used to control the receive antenna(s) of multiple ones of the arrays 30. FIG. 10 illustrates a variation where each array 30 has its own transmit circuit 112 and receive circuit 114 (only one detector array 30, and the transmit circuit 112 and receive circuit 114 for that detector array 30 are illustrated; each additional detector array 30 would have its own transmit circuit and receive circuit). A subcontroller 118a, 118b, 118b would be provided for each detector array 30, with each subcontroller 118a, 118b, 118c in communication with the main controller 116.

Detection of the presence of the analyte 52 in the sample 50 can be achieved, for example, by identifying a change in the signal intensity detected by the receive antenna at a known frequency associated with the analyte. The change may be a decrease in the signal intensity or an increase in the signal intensity depending upon how the transmit signal interacts with the analyte. The known frequency associated with the analyte can be established, for example, through testing of solutions known to contain the analyte. Determination of the amount of the analyte can be achieved, for example, by identifying a magnitude of the change in the signal at the known frequency, for example using a function where the input variable is the magnitude of the change in signal and the output variable is an amount of the analyte. The determination of the amount of the analyte can further be used to determine a concentration, for example based on a known mass or volume of the sample. In an embodiment, presence of the analyte and determination of the amount of analyte may both be determined, for example by first identifying the change in the detected signal to detect the presence of the analyte, and then processing the detected signal(s) to identify the magnitude of the change to determine the amount The interaction between the transmitted signal and the analyte may, in some cases, increase the intensity of the signal(s) that is detected by the receive antenna, and may, in other cases, decrease the intensity of the signal(s) that is detected by the receive antenna. For example, in one non-limiting embodiment, when analyzing the detected response, compounds in the sample, including the analyte of interest that is being detected, can absorb some of the transmit signal, with the absorption varying based on the frequency of the transmit signal. The response signal detected by the receive antenna may include drops in intensity at frequencies where compounds in the sample, such as the analyte, absorb the transmit signal. The frequencies of absorption are particular to different analytes. The response signal(s) detected by the receive antenna can be analyzed at frequencies that are associated with the analyte of interest to detect the analyte based on drops in the signal intensity corresponding to absorption by the analyte based on whether such drops in signal intensity are observed at frequencies that correspond to the absorption by the analyte of interest. A similar technique can be employed with respect to increases in the intensity of the signal(s) caused by the analyte.

In one embodiment, a min/max subtraction method can be used at selected frequencies across the various scans of the scan routine. In another embodiment, a difference between power received by the antenna(s) acting as the receive antenna(s) at selected frequencies can be used.

As mentioned above, the detector elements may be decoupled (which may also be referred to as detuned or the like) from one another. However, in some embodiments, the detector elements may not be decoupled from one another. One technique for decoupling the detector elements is to intentionally configure the detector elements to have intentionally different geometries. Intentionally different geometries refers to differences in geometric configurations of the detector elements that are intentional, and is distinct from differences in geometry of the detector elements that may occur by accident or unintentionally, for example due to manufacturing errors or tolerances when fabricating the detector elements. In an embodiment, coupling between the detector element acting as the transmit antenna and the detector element acting as the receive antenna is 95% or less. In another embodiment, coupling between the transmit antenna and the receive antenna is 90% or less. In another embodiment, coupling between the transmit antenna and the receive antenna is 85% or less. In another embodiment, coupling between the transmit antenna and the receive antenna is 75% or less The different geometries of the detector elements may manifest itself, and may be described, in a number of different ways. For example, in a plan view of each of the detector elements (such as in FIG. 6), the shapes of the perimeter edges of the detector elements may be different from one another. The different geometries may result in the detector elements having different surface areas in plan view. The different geometries may result in the detector elements having different aspect ratios in plan view (i.e. a ratio of their sizes in different dimensions; for example, as discussed in further detail below, the ratio of the length divided by the width of the detector element 120a may be different than the ratio of the length divided by the width for the detector element 120f). In some embodiments, the different geometries may result in the detector elements having any combination of different perimeter edge shapes in plan view, different surface areas in plan view, and/or different aspect ratios. In some embodiments, the detector elements may have one or more holes formed therein within the perimeter edge boundary, or one or more notches formed in the perimeter edge.

So as used herein, a difference in geometry or a difference in geometrical shape of the detector elements refers to any intentional difference in the figure, length, width, size, shape, area closed by a boundary (i.e. the perimeter edge), etc. when the detector elements are viewed in a plan view. Many different shapes or geometries of the detector elements are possible.

The detector elements can have any configuration and can be formed from any suitable material that allows them to perform the functions of the detector elements as described herein. In one embodiment, the detector elements can be formed by strips of material. A strip of material can include a configuration where the strip has at least one lateral dimension thereof greater than a thickness dimension thereof when the antenna is viewed in a plan view (in other words, the strip is relatively flat or of relatively small thickness compared to at least one other lateral dimension, such as length or width when the antenna is viewed in a plan view as in FIGS. 5 and 6). A strip of material can include a wire. The detector elements can be formed from any suitable conductive material(s) including metals and conductive non-metallic materials. Examples of metals that can be used include, but are not limited to, copper or gold. Another example of a material that can be used is non-metallic materials that are doped with metallic material to make the non-metallic material conductive.

Another technique to achieve decoupling of the detector elements is to use an appropriate spacing between each detector elements with the spacing being sufficient to force most or all of the signal(s) transmitted by the detector element acting as the transmit antenna into the sample, thereby minimizing the direct receipt of electromagnetic energy by the detector element acting as the receive antenna directly from the transmit antenna. The appropriate spacing can be used by itself to achieve decoupling of the detector elements. In another embodiment, the appropriate spacing can be used together with differences in geometry of the detector elements to achieve decoupling.

The terminology used in this specification is intended to describe particular embodiments and is not intended to be limiting. The terms "a," "an," and "the" include the plural forms as well, unless clearly indicated otherwise. The terms "comprises" and/or "comprising," when used in this specification, specify the presence of the stated features, integers, steps, operations, elements, and/or components, but do not preclude the presence or addition of one or more other features, integers, steps, operations, elements, and/or components.

The examples disclosed in this application are to be considered in all respects as illustrative and not limitative. The scope of the invention is indicated by the appended claims rather than by the foregoing description; and all changes which come within the meaning and range of equivalency of the claims are intended to be embraced therein.

The invention claimed is:

1. An analyte sensor, comprising:
a housing;
a sample chamber defined in the housing, the sample chamber is configured to receive a container at least partially therein that contains a sample;
at least one detector array mounted in the housing adjacent to and facing the sample chamber, the at least one detector array having two or more detector elements, at least one of the detector elements of the two or more detector elements is able to operate as a transmit element and at least one of the detector elements of the two or more detector elements is able to operate as a receive element, wherein the transmit element and the receive element are disposed on a substrate and are each located on a same side of the sample chamber;
the transmit element is positioned and arranged to transmit a signal that is in a radio or microwave frequency range of the electromagnetic spectrum into the sample chamber and into the sample contained in the container, and the receive element is positioned and arranged to detect a response resulting from transmission of the signal by the transmit element into the sample chamber and into the sample contained in the container;
a transmit circuit that is electrically connectable to the transmit element, the transmit circuit is configured to generate the signal to be transmitted by the transmit element; and
a receive circuit that is electrically connectable to the receive element, the receive circuit is configured to receive a response detected by the receive element.

2. The analyte sensor of claim 1, wherein the at least one detector array is a decoupled detector array and the two or more detector elements are decoupled from one another.

3. The analyte sensor of claim 1, wherein the at least one detector array includes at least three of the detector elements, and the transmit circuit is selectively electrically connectable to any one or more of the at least three detector elements so that any one or more of the at least three detector elements can function as the transmit element, and the receive circuit is selectively electrically connectable to any one or more of the at least three detector elements so that any one or more of the at least three detector elements can function as the receive element.

4. The analyte sensor of claim 1, wherein the sample is a liquid.

5. The analyte sensor of claim 4, wherein the liquid is blood.

6. The analyte sensor of claim 1, wherein the sample is human tissue, animal tissue, plant tissue, an inanimate object, soil, a fluid, genetic material, or a microbe.

7. An analyte sensor, comprising:
a housing;
a sample chamber defined in the housing, the sample chamber is configured to receive a container at least partially therein that contains a sample;
a plurality of detector arrays mounted in the housing adjacent to and facing the sample chamber, each detector array having two or more detector elements, at least one of the detector elements of the two or more detector elements is able to operate as a transmit element and at least one of the detector elements of the two or more detector elements is able to operate as a receive element;
the transmit element is positioned and arranged to transmit a signal that is in a radio or microwave frequency range of the electromagnetic spectrum into the sample chamber and into the sample contained in the container, and the receive element is positioned and arranged to detect a response resulting from transmission of the signal by the transmit element into the sample chamber and into the sample contained in the container;
a transmit circuit that is electrically connectable to the transmit element, the transmit circuit is configured to generate the signal to be transmitted by the transmit element; and
a receive circuit that is electrically connectable to the receive element, the receive circuit is configured to receive a response detected by the receive element.

8. The analyte sensor of claim 7, wherein the detector arrays are spaced from one another around a perimeter of the sample chamber.

9. An analyte sensor, comprising:
a housing;
a sample chamber defined in the housing, the sample chamber is configured to receive a container at least partially therein that contains a sample containing at least one analyte of interest;
an antenna array mounted in the housing adjacent to the sample chamber, the antenna array having two or more antenna elements facing toward the sample chamber, at least one of the antenna elements of the two or more antenna elements is able to operate as a transmit antenna to transmit a signal that is in a radio or microwave frequency range of the electromagnetic spectrum into the sample chamber and into the sample contained in the container, and at least one of the antenna elements of the two or more antenna elements is able to operate as a receive antenna to detect a response resulting from transmission of the signal by the transmit antenna into the sample chamber and into the sample contained in the container, wherein the transmit antenna and the receive antenna are disposed on a substrate and are each located on a same side of the sample chamber;

a transmit circuit that is electrically connectable to the transmit antenna, the transmit circuit is configured to generate the signal to be transmitted by the transmit antenna; and a receive circuit that is electrically connectable to the receive antenna, the receive circuit is configured to receive a response detected by the receive antenna.

10. The analyte sensor of claim 9, wherein the antenna array is a decoupled antenna array and the two or more antenna elements are decoupled from one another.

11. The analyte sensor of claim 9, comprising at least one additional antenna array mounted in the housing adjacent to the sample chamber, the at least one additional antenna array having two or more additional antenna elements facing toward the sample chamber, at least one of the additional antenna elements of the two or more additional antenna elements operating as an additional transmit antenna to transmit a signal that is in a radio or microwave frequency range of the electromagnetic spectrum into the sample chamber and into the sample contained in the container, and at least one of the additional antenna elements of the two or more additional antenna elements operating as an additional receive antenna to detect a response resulting from transmission of the signal by the additional transmit antenna into the sample chamber and into the sample contained in the container.

12. The analyte sensor of claim 11, wherein the antenna array and the additional antenna array are spaced from one another around a perimeter of the sample chamber.

13. The analyte sensor of claim 9, wherein the antenna array includes at least three of the antenna elements, and the transmit circuit is selectively electrically connectable to any one or more of the at least three antenna elements so that any one or more of the at least three antennas can function as the transmit antenna, and the receive circuit is selectively electrically connectable to any one or more of the at least three antenna elements so that any one or more of the at least three antennas can function as the receive antenna.

14. The analyte sensor of claim 9, wherein the sample is human tissue, animal tissue, plant tissue, an inanimate object, soil, a fluid, genetic material, or a microbe.

15. The analyte sensor of claim 9, wherein the sample is a liquid.

16. The analyte sensor of claim 15, wherein the liquid is blood.

* * * * *